United States Patent
Cho

(10) Patent No.: US 9,760,197 B2
(45) Date of Patent: Sep. 12, 2017

(54) TOUCH WINDOW WITH SENSOR MEMBER

(71) Applicant: LG INNOTEK CO., LTD., Seoul (KR)

(72) Inventor: Sung Jung Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 177 days.

(21) Appl. No.: 13/912,928

(22) Filed: Jun. 7, 2013

(65) Prior Publication Data

US 2013/0328808 A1    Dec. 12, 2013

(30) Foreign Application Priority Data

Jun. 8, 2012    (KR) .................. 10-2012-0061738

(51) Int. Cl.
*G06F 1/16*    (2006.01)
*G06F 3/041*    (2006.01)
*G06F 3/042*    (2006.01)

(52) U.S. Cl.
CPC ............ *G06F 3/0412* (2013.01); *G06F 3/042* (2013.01)

(58) Field of Classification Search
CPC .......... G06F 3/044; G06F 2203/04103; G06F 3/0488; G06F 3/0416; G06F 2203/04106; G02F 1/13338

See application file for complete search history.

(56) References Cited

U.S. PATENT DOCUMENTS

| | | | |
|---|---|---|---|
| 2008/0007964 A1* | 1/2008 | Lin ................................. | 362/602 |
| 2008/0202912 A1* | 8/2008 | Boddie et al. ................. | 200/600 |
| 2010/0075720 A1* | 3/2010 | Lee et al. ....................... | 455/566 |
| 2011/0025645 A1* | 2/2011 | Mata et al. .................... | 345/174 |
| 2011/0096477 A1* | 4/2011 | Wang ................... | H04M 1/0266 361/679.01 |
| 2011/0109590 A1* | 5/2011 | Park .............................. | 345/174 |
| 2011/0279397 A1* | 11/2011 | Rimon et al. ................. | 345/173 |
| 2012/0032917 A1* | 2/2012 | Yamaguchi .................... | 345/174 |
| 2012/0050173 A1* | 3/2012 | Chou ..................... | G06F 3/041 345/173 |
| 2012/0075233 A1* | 3/2012 | Lakshminarayanan et al. ............................ | 345/174 |
| 2013/0199915 A1* | 8/2013 | Guard .................... | G06F 3/044 200/600 |

FOREIGN PATENT DOCUMENTS

CN    201233573 Y    5/2009

OTHER PUBLICATIONS

Office Action dated Oct. 26, 2015 in Chinese Application No. 201310232506.0.

* cited by examiner

*Primary Examiner* — Bryan Earles
(74) *Attorney, Agent, or Firm* — Saliwanchik, Lloyd & Eisenschenk

(57) ABSTRACT

Disclosed is a touch window with a sensor member. The touch window includes: a cover window including an active area, an unactive area, and a function area; and a sensing electrode on the active area, wherein the function area includes a first printing layer on the cover window and a sensor member on the first printing layer.

13 Claims, 3 Drawing Sheets

TOUCH WINDOW WITH SENSOR MEMBER

CROSS-REFERENCE TO RELATED APPLICATION

This application claims the benefit under 35 U.S.C. §119 of Korean Patent Application No. 10-2012-0061738, filed Jun. 8, 2012, which is hereby incorporated by reference in its entirety.

TECHNICAL FIELD

The disclosure relates to a touch window with sensor member.

BACKGROUND

The embodiment relates to a touch window with a sensor member.

With the development of electronic devices, user interfaces are provided as various applications. The user interface has been continuously developed to allow a user to more naturally and readily use the user interface while providing the user with information. Among devices for providing a simple user interface, a touch input device applying an operation or position command in a touch scheme includes a touch screen used for various electronic/communication devices, such as an automated teller machine (ATM) in a bank, a personal digital assistant (PDA), and a portable phone, and a touch pad for a notebook computer.

As a member used for the touch input device according to the related art, a touch screen panel (TSP), particularly, a contact resistive touch screen panel cannot acquire continuous data proportional to contact force of a pointing object (e.g., stylus tip or finger), and may recognize only a touch to detect only a contact position.

FIG. 1 is a diagram illustrating a touch input scheme of a touch screen panel according to the related art.

Referring to FIG. 1, a capacitive type touch screen panel includes a sensing electrode for sensing a touch, a driving chip for providing a function corresponding to a sensed touch input, and a connection circuit connecting the driving chip to the sensing electrode, and implements a touch input in a complex scheme. A user may input the touch on the touch screen panel by touching a sensed region by a hand or a sensible object.

BRIEF SUMMARY

According to the embodiment, there is provided a touch window including: a cover window including an active area, an unactive area, and a function area; and a sensing electrode on the active area, wherein the function area comprises: a first printing layer on the cover window; and a sensor member on the first printing layer.

According to the touch window of the embodiment, since the sensor member is disposed in a command icon pattern part and driving of a command icon is determined according to approach of an object or a finger, a function key region can be implemented through a simpler scheme as compared with that of the related art.

Further, according to the touch window of the embodiment, a light source is not provided as a separate module, but mounted on a conductive polymer after forming the conductive polymer, which is curable at the normal temperature or less, on a function key region.

Accordingly, since a separate LCD module is not required, a process efficiency and reliability of the touch window can be improved.

DETAILED DESCRIPTION

Figure 1:
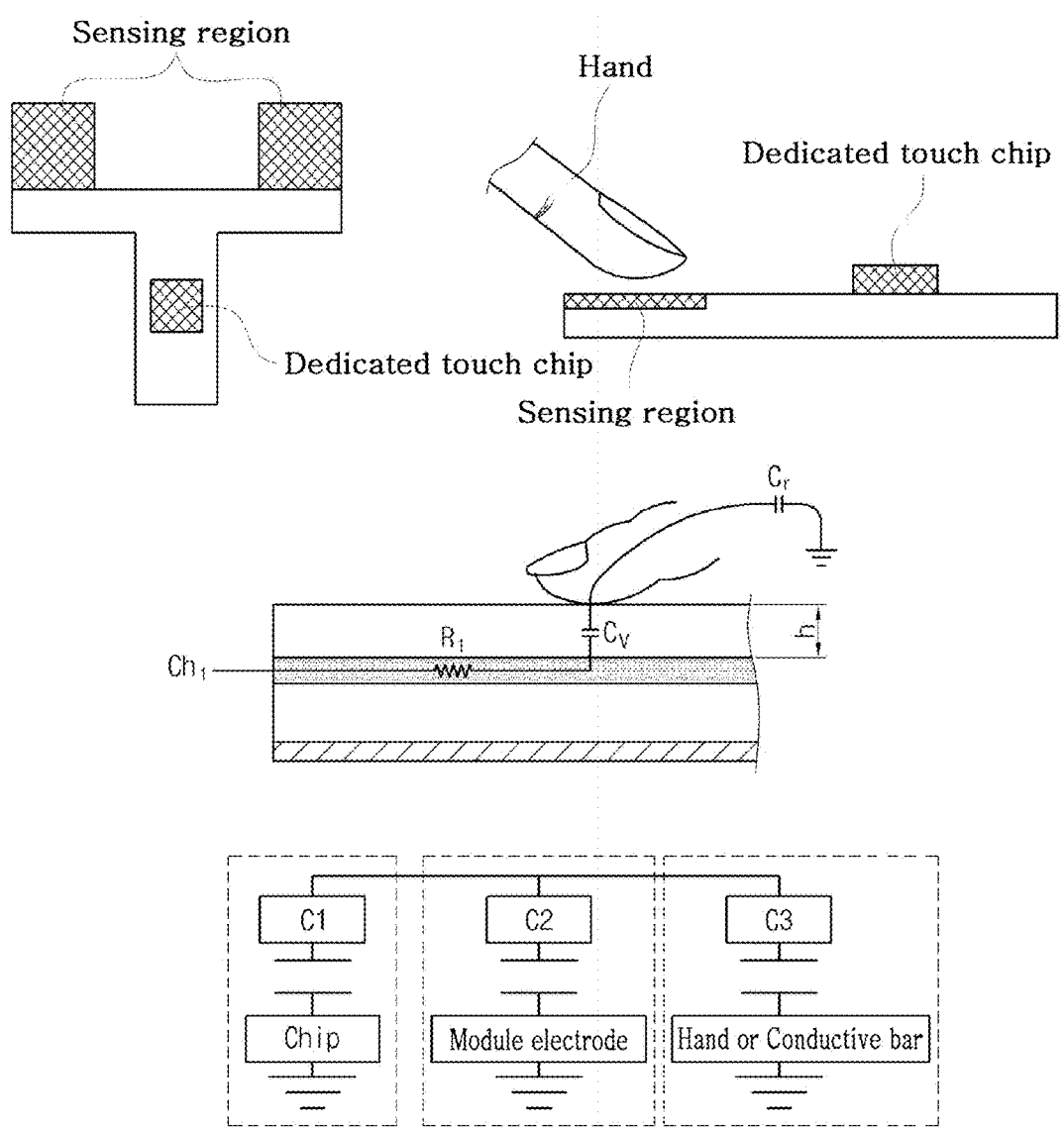
FIG. 1 is a view showing a touch input scheme of a touch screen panel according to the related art.

Hereinafter, exemplary embodiments will be described in more detail with reference to accompanying drawings. In the following description, for the illustrative purpose, the same components will be assigned with the same reference numerals, and the repetition in the description about the same components will be omitted in order to avoid redundancy. The terms "first" and "second" can be used to refer to various components, but the components may not be limited to the above terms. The terms will be used to discriminate one component from the other component.

Figure 2:
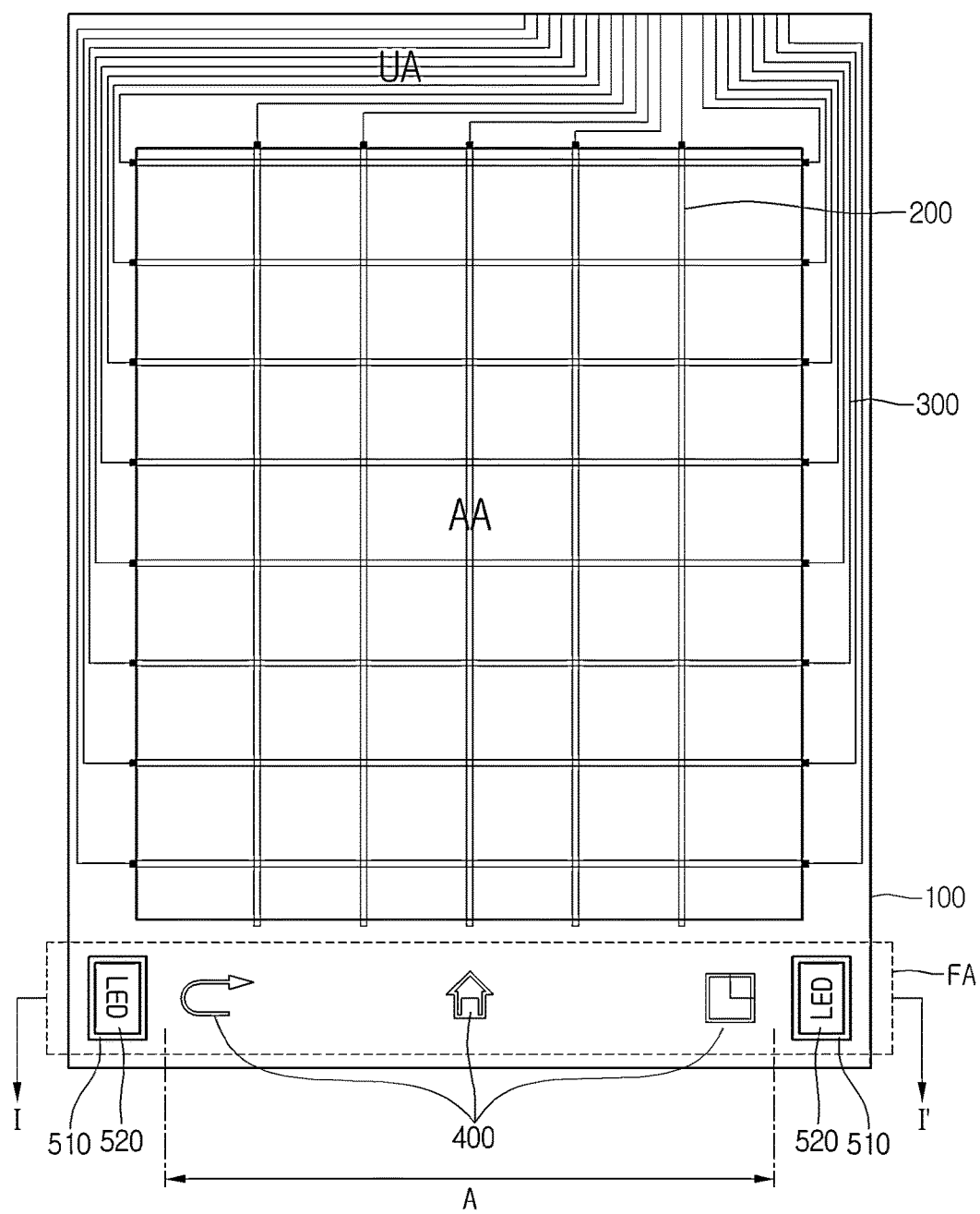
FIG. 2 is a view showing a touch window according to the embodiment.

FIG. 2 is a view showing a touch window according to the embodiment.

Referring to FIG. 2, the touch window according to the embodiment includes a cover window 100 having an active area AA, an unactive area UA, and a function area FA, a sensing electrode 200 formed on the active area AA, a wire electrode 300 formed on the unactive area UA, and a command icon pattern part 400 formed on the function area FA.

The cover window 100 may include glass or plastic. For example, the cover window 100 may include tempered glass, semi-tempered glass, soda-lime glass, and tempered plastic.

The cover window 100 may include the active area AA, the unactive UA, and the function area FA. The active area AA refers to an area to which a touch command of a user may be input. To the contrary to the active area AA, the unactive area UA signifies an area where the touch command input is not realized because the area is not activated even if the touch of the user is input thereto. The function area FA refers to an area on which button parts are formed and which performs touch command input and blinking functions according to the touch of the user.

The sensing electrode 200 is formed on the active area AA. In detail, a sensing electrode pattern is formed on the active area AA. The sensing electrode pattern includes a first sensing electrode pattern which is longitudinally formed and a second sensing electrode pattern which is transversely formed. The sensing electrode pattern is densely formed on an entire surface of the active area AA of the cover window 100.

The sensing electrode 200 may include at least one selected from the group consisting of indium tin oxide, indium zinc oxide, copper oxide, a carbon nano tube (CNT), and an Ag nano wire.

The first sensing electrode pattern and the second sensing electrode pattern may be formed through various schemes according to a structure of a touch window.

For example, the first and second sensing electrode patterns may be formed on one surface of the cover window 100.

The first sensing electrode pattern may be formed on one surface of the cover window 100, and the second sensing electrode pattern may be formed on a substrate disposed on the cover window 100.

The first sensing electrode pattern may be formed on one surface of a first substrate disposed on the cover window 100, and the second sensing electrode pattern may be formed on a second substrate disposed on the first substrate.

The first sensing electrode pattern may be formed on one surface of glass disposed on the cover window 100, and the second sensing electrode pattern may be formed on an opposite surface of the glass.

The touch window according to the touch window may have various structures depending on positions of the first sensing electrode pattern and the second sensing electrode pattern. However, the embodiment is not limited thereto. The first sensing electrode pattern and the second sensing electrode pattern may be formed at various positions.

Figure 3:
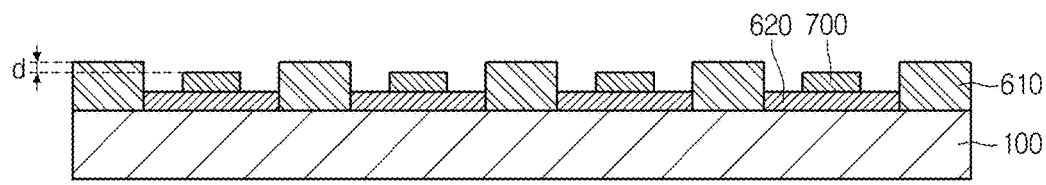
FIGS. 3 and 4 are sectional views showing a region A taken along line I-I' of FIG. 2.
Figure 4:
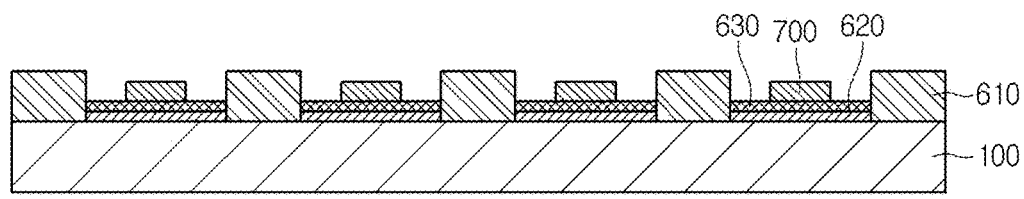

The command icon pattern part 400 is formed in the function area FA. The command icon pattern part 400 may be formed by patterning a printing layer on the cover window 100. In detail, referring to FIGS. 3 and 4, a first printing layer 610 may be formed by patterning a command icon region on the cover window 100. The first printing layer 610 may be formed by coating black ink.

Next, a second printing layer 620 may be further formed on a top surface of the first printing layer 610 and the command icon region. The second printing layer 620 may be formed by coating white ink. Accordingly, the first printing layer 610 and the second printing layer 620 are formed on the cover window 100 so that a command icon pattern part 500 forming a command icon region is formed.

A sensor member 700 may be disposed on the function area FA. That is, the sensor member 700 may be disposed in the command icon pattern part 400. The sensor member 700 may be disposed on the first printing layer 610. The sensor member 700 may be disposed on the second printing layer 620 which is formed inside the command icon pattern part 400.

A support layer 630 is further formed on the second printing layer 620, and the sensor member 700 may formed on the support layer 630. In this case, the support layer 630 may include the same material as a material of the first printing layer 610 or the second printing layer 620.

The sensor member 700 may include a proximity sensor or an illumination sensor. Preferably, the sensor member 700 may include the proximity sensor.

The proximity sensor is a type of a position sensor or a displacement sensor. When an object approaches within a sensing distance of the proximity sensor, the proximity sensor may generate a sensing signal. That is, the proximity sensor signifies a sensor detecting presence of an object approaching the terminal or an object existing around the terminal 100 using an electromagnetic force or infrared ray without a mechanical contact.

For example, the proximity sensor 132 may include a transmission photoelectric sensor, a direct reflection photoelectric sensor, a mirror reflection photoelectric sensor, a high frequency oscillating proximity sensor, a capacitive proximity sensor, a magnetic proximity sensor, and an infrared proximity sensor.

Figure 5:
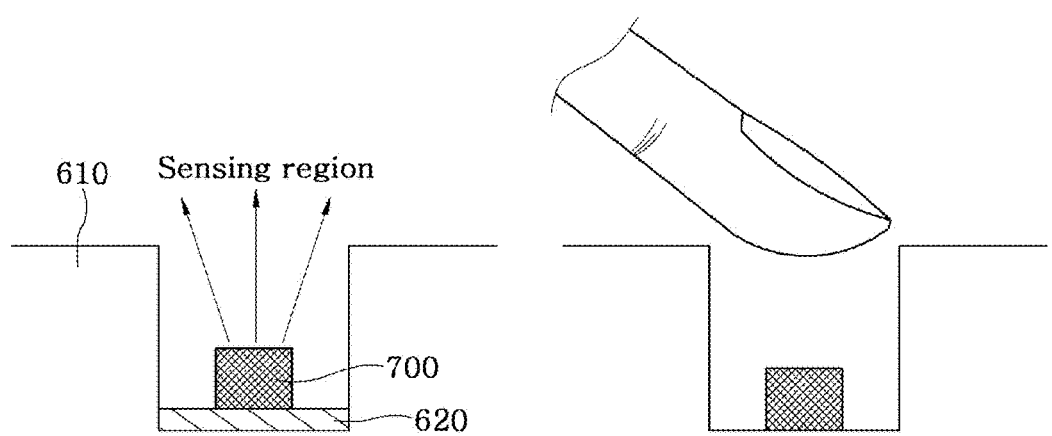
FIG. 5 is a diagram showing a driving scheme of a proximity sensor according to the embodiment.

Accordingly, as shown in FIG. 5, when the finger or the object approaches within a sensing distance of the command icon pattern part 500, the proximity sensor 700 may generate a sensing signal.

The sensor member 700 may be received in the command icon pattern part 400. In this case, the sensor member 700 may be received in the command icon pattern part 400 or may be formed so that a surface, that is, a top surface of the sensor member 700 may aligned on the same plane with a top surface of the first printing layer 610.

The first printing layer 610 may have a thickness in the range of about 7 μm to about 10 μm. The second printing layer 620 may have a thickness in the range of about 3 μm to about 5 μm. Accordingly, the sensor member 700 may be formed in a command icon pattern at a height in the range of about 2 μm to about 7 μm.

The height difference d between the top surface of the sensor member 700 and a bottom surface of the first printing layer 610 (boundary between the cover window 100 and the first printing layer 610) may be in the range of about 0 μm (parallel) to about 5 μm.

When the height difference between the top surface of the sensor member 700 and the bottom surface of the first printing layer 610 deviates from 0 μm, the sensor member 700 may protrude out of the printing layer so that the sensor member may be damaged. When the height difference between the top surface of the sensor member 700 and the bottom surface of the first printing layer 610 exceeds 5 μm, a sensing signal is weak so that approach of the object cannot be exactly sensed.

A wire electrode 300 is formed on the unactive area UA. The wire electrode 300 is electrically connected to the sensing electrode 200. The wire electrode 300 may transfer a touch sensing signal sensed from the sensing electrode 200 to a driving chip through the connector.

Further, the wire electrode 300 is electrically connected to the sensor member 700. The wire electrode 300 may transfer the sensing signal generated from the sensor member 700 to the driving chip. The wire electrode 300 may be connected to a control circuit and transfer the sensing signal to the control circuit.

A light source 520 may be disposed on the function area FA. In detail, a conductive polymer 510 is formed on the function area FA, and the light source 520 may be mounted on the conductive polymer 510.

The conductive polymer 510 may include a conductive material which is cured at a normal temperature or less. For example, the conductive polymer 510 may include at least one conductive material such as Teflon, acryl, and urethane. The conductive polymer 510 may be disposed at a left side and a right side of the function area FA.

The conductive polymer 510 may be coated on the function area FA in the form of paste and then cured.

In addition, the light source 520 may include a lateral type LED. In detail, light from the light source 520 may be radiated in left and right directions in the function area FA.

The light radiated from the light source is incident to the command icon pattern part 400 formed on the function area FA. In detail, when the finger or the object approaches the command icon pattern part 400 so that a sensing signal is generated, the light source 520 performs a blinking function for feedbacking the approach. The light source 520 may radiate light toward the command icon pattern part 400 which performs the blinking function by receiving the light.

The function area FA may further include a light diffusion sheet to diffuse or scatter the light. The light diffusion sheet may include various resins such as polycarbonate. Accordingly, the light radiated from the light source 520 may be uniformly diffused toward the command icon pattern part 500 and incident to the command icon pattern part 500.

The touch window according to the embodiment includes a sensor member and a light source on the function area.

Accordingly, an operation scheme of the function area may be simplified by implementing the command icon pattern part using the sensor instead of a capacitive touch key.

According to the related art, after the sensing electrode is formed on a command icon pattern part, the driving chip for recognizing a sensing signal according to variation in capacitance due to contact of the sensing electrode and the connection circuit are simultaneously formed, so that an implementation of the function area is very complex.

However, according to the touch window of the embodiment, instead of forming the sensing electrode, since the sensor member is disposed in a command icon pattern part and driving of a command icon is determined according to approach of an object or a finger, a function key region can be implemented through a simpler scheme as compared with that of the related art.

In addition, according to the touch window of the embodiment, the light source may be mounted on the function area.

According to the related art, a module including a light source such as an LED is required separately from the function area. Accordingly, an additional process of bonding the module with the touch screen panel is required and the reliability is reduced due to failure of the bonding process.

Therefore, according to the touch window of the embodiment, a light source is not provided as a separate module, but mounted on a conductive polymer after forming the conductive polymer, which is curable at the normal temperature or less, on a function key region.

Accordingly, since a separate LCD module is not required, a process efficiency and reliability of the touch window can be improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a cover window including an active area, an unactive area, and a function area;
   a sensing electrode on the active area; and
   a conductive polymer disposed on the function area to mount a light source thereon,
   wherein the function area comprises:
      a first printing layer on a top surface of the cover window;
      a second printing layer on the top surface of the cover window; and
      a sensor member on the second printing layer,
   wherein the sensor member comprises a proximity sensor or an illumination sensor,
   wherein both the first printing layer and the second printing layer are in direct physical contact with the cover window,
   wherein both the first printing layer and the second printing layer comprise patterns for icons in the function area,
   wherein the first printing layer is in direct physical contact with the second printing layer,
   wherein the sensor member is in direct physical contact with the second printing layer,
   wherein each of the first printing layer and the second printing layer comprises ink, and
   wherein the light source radiates light toward the patterns in the function area and the function area receives the light.

2. The touch window of claim 1, further comprising a wire electrode formed on the unactive area and connected to the sensing electrode.

3. The touch window of claim 2, further comprising a control circuit to read out a sensing signal generated from the sensor member.

4. The touch window of claim 1, wherein the first printing layer has a thickness in a range of about 7 μm to about 10 μm, and the second printing layer has a thickness in a range of about 3 μm to about 5 μm.

5. The touch window of claim 1, further comprising a support layer disposed between the sensor member and the second printing layer.

6. The touch window of claim 1, wherein a top surface of the sensor member is aligned on a same plane with a top surface of the first printing layer.

7. The touch window of claim 1, wherein a height difference between a top surface of the sensor member and a bottom surface of the first printing layer is in a range of about 0 μm to about 5 μm.

8. The touch window of claim 1, wherein a curing temperature of the conductive polymer is 25° C. or less.

9. The touch window of claim 1, wherein the conductive polymer comprises at least one conductive material of Teflon, acryl, and urethane.

10. The touch window of claim 1, wherein the light source comprises a lateral type light emitting diode.

11. The touch window of claim 10, wherein the light source radiates light toward a command icon pattern part.

12. The touch window of claim 10, further comprising a light diffusion sheet to diffuse light radiated from the light source.

13. The touch window of claim 1, wherein the first printing layer is formed by patterning a command icon region on the cover window and the second printing layer is formed on a top surface of the first printing layer and the command icon region.

* * * * *